United States Patent
Chen et al.

(10) Patent No.: US 11,137,545 B1
(45) Date of Patent: Oct. 5, 2021

(54) TERAHERTZ WAVEGUIDE

(71) Applicant: JIANGSU UNIVERSITY, Zhenjiang (CN)

(72) Inventors: Mingyang Chen, Zhenjiang (CN); Hang Xu, Zhenjiang (CN); Yuan Zhang, Zhenjiang (CN); Tongtong Bai, Zhenjiang (CN); Jianquan Yao, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/280,920

(22) PCT Filed: Jun. 18, 2019

(86) PCT No.: PCT/CN2019/091643
§ 371 (c)(1),
(2) Date: Mar. 29, 2021

(87) PCT Pub. No.: WO2020/237744
PCT Pub. Date: Dec. 3, 2020

(30) Foreign Application Priority Data

May 31, 2019 (CN) .......................... 201910466568.5

(51) Int. Cl.
*G02B 6/26* (2006.01)
*G02B 6/02* (2006.01)
(Continued)

(52) U.S. Cl.
CPC ......... *G02B 6/262* (2013.01); *G02B 6/02319* (2013.01); *G02B 6/02347* (2013.01);
(Continued)

(58) Field of Classification Search
CPC ............ G02B 6/02319; G02B 6/02347; G02B 6/02366; G02B 6/1225; G02B 6/262; G02B 6/2804; G02B 2006/1215
(Continued)

(56) References Cited

U.S. PATENT DOCUMENTS

2008/0025680 A1* 1/2008 Sun .......................... H01P 3/16
385/125
2009/0097809 A1* 4/2009 Skorobogatiy .... G02B 6/02304
385/125

FOREIGN PATENT DOCUMENTS

CN 101630040 A 1/2010
CN 104834058 A 8/2015

* cited by examiner

*Primary Examiner* — Michael P Mooney
(74) *Attorney, Agent, or Firm* — Bayramoglu Law Offices LLC

(57) ABSTRACT

A terahertz waveguide includes an input segment, a transmission segment and an output segment. The input segment includes an input waveguide and an input microstructured waveguide. One end of the input waveguide is connected with one end of the core of the input microstructured waveguide. The transmission segment includes at least a sub-wavelength waveguide, an air cladding surrounding the sub-wavelength waveguide and a solid outer cladding surrounding the air cladding. The other end of the core of the input microstructured waveguide is connected with one end of the sub-wavelength waveguide. The other end of the sub-wavelength waveguide is connected with the core of the output microstructured waveguide. One end of the solid outer cladding is connected with the cladding of the input microstructured waveguide, and an output segment. The output segment includes an output microstructured waveguide and an output waveguide.

11 Claims, 12 Drawing Sheets

(51) Int. Cl.
  *G02B 6/28* (2006.01)
  *G02B 6/122* (2006.01)
(52) U.S. Cl.
  CPC ....... *G02B 6/02366* (2013.01); *G02B 6/1225* (2013.01); *G02B 6/2804* (2013.01)
(58) Field of Classification Search
  USPC ...................................... 385/45, 49–51, 125
  See application file for complete search history.

TERAHERTZ WAVEGUIDE

CROSS REFERENCE TO THE RELATED APPLICATIONS

This application is the national phase entry of International Application No. PCT/CN2019/091643, filed on Jun. 18, 2019, which is based upon and claims priority to Chinese Patent Application No. 201910466568.5, filed on May 31, 2019, the entire contents of which are incorporated herein by reference.

TECHNICAL FIELD

The present invention relates to the terahertz field, in particular to a terahertz waveguide.

BACKGROUND

Terahertz waves have shown the special characteristics of low energy, water absorption, strong penetration and so on, so it has very important applications in medical imaging, chemistry, biology, communication and other fields. Because the terahertz signal is greatly affected by water vapor absorption and atmospheric scattering, the attenuation coefficient of terahertz waves in free space is so large that it cannot be transmitted over a long distance. Therefore, to promote the development of terahertz technology, the research on terahertz waveguide is of great significance.

Some researchers have proposed a sapphire fiber with a diameter of 150-325 μm, which can realize low loss single-mode transmission of terahertz wave. On this basis, some researchers proposed a sub-wavelength terahertz solid core fiber. The diameter of the fiber core is about 200 μm, the air outside the core is worked as the fiber cladding, and the core is made of polyethylene (PE). The loss near 0.3 THz is less than 0.01 $cm^{-1}$. Due to the small cross-section of the core, the coupling efficiency between the fiber core and the terahertz source is only about 20%.

The main disadvantage of sub-wavelength solid core optical fiber is that it needs special support components in the application process, and the system stability is poor. In addition, the fiber core is directly exposed to the air, and its transmission performance is affected by the external environment and is easily disturbed by the surrounding signals. Finally, due to the small cross-section size of the core, the coupling between the core and the terahertz source is also difficult.

SUMMARY

In view of the deficiencies in the prior art, the present invention provides a terahertz waveguide, which solves the problem that the conventional sub-wavelength waveguide needs mechanical support in the whole transmission direction, ensures the minimum influence of the structure at both ends on the transmission of internal terahertz wave in the main transmission section, and realizes the isolation between the transmission waveguide and the environment.

The present invention realizes the above technical purpose through the following technical means.

Herein presents a terahertz waveguide, wherein the waveguide includes an input segment, a transmission segment and an output segment, which are listed as follows:

An input segment, wherein the input segment includes an input waveguide (1), and an input microstructured waveguide, wherein one end of the input waveguide is connected with one end of the core of the input microstructured waveguide;

A transmission segment, wherein the transmission segment includes at least a sub-wavelength waveguide (3), an air cladding surrounding the sub-wavelength waveguide (3) and a solid outer cladding (6) surrounding the air cladding, wherein the other end of the input microstructured waveguide is connected with one end of the sub-wavelength waveguide, wherein the other end of the sub-wavelength waveguide is connected with the core of the output microstructured waveguide, wherein one end of the solid outer cladding are connected with the cladding of the input microstructured waveguide;

An output segment, wherein the output segment includes an output microstructured waveguide (4) and an output waveguide (5), wherein the other end of the sub-wavelength waveguide (3) is connected with the end of the core of the output microstructured waveguide (4), the other end of the outer cladding (6) is connected with one end of the cladding of the output microstructured waveguide (4), the other end of the core of the output microstructured waveguide (4) is connected with one end of the output waveguide (5).

The diameter of the sub-wavelength waveguide (3) $d_c$ satisfies $d_c < \lambda_0$, where $\lambda_0$ is the operating wavelength, wherein the cladding of the input and output microstructured waveguides consists of base material and regularly arranged air holes, and the core of the microstructured waveguides consists of base material.

Preferably, the input segment includes an input tapered waveguide (1-1) and an input straight waveguide (1-2), the small end of the input tapered waveguide (1-1) is connected with one end of the input straight waveguide (1-2), and the other end of the input straight waveguide is connected with one end of the core of the input microstructured waveguide (2), wherein the output waveguide (5) is a tapered waveguide, and the small end of the output waveguide (5) is connected with the other end of the core of the microstructured waveguide.

Preferably, the cross-sections of the input tapered waveguide (1-1), the input straight waveguide (1-2), the input microstructured waveguide (2), the output microstructured waveguide (4), and the output tapered waveguide (5) are of circular symmetry, wherein the input tapered waveguide (1-1), the input straight waveguide (1-2) and the input microstructured waveguide (2) are coaxial, wherein the output microstructured waveguide (4) and the output waveguide (S) are coaxial, wherein the waveguide parameters should meet the condition of $d_{m2} > d_{ts2} > d_{m1} > d_{ts1} = d_z > d_c$ where $d_{ts2}$, $d_{m2}$, $d_{ts1}$, $d_z$, $d_{m1}$ denote respectively the diameter of the small end of the output waveguide (5), the core diameter of the output microstructured waveguide (4), the diameter of the small end of the input tapered waveguide (1-1), the diameter of the input straight waveguide (1-2), and the core diameter of the input microstructured waveguide (2).

Preferably, the numerical aperture, the mode field diameter and the waveguide diameter of the segments should meet the conditions of $NA_4 \cdot d_{ts2} > NA_0 \cdot d_z > NA_1 \cdot W_1 > NA_2 \cdot d_c > NA_3 \cdot W_3$, where $NA_0$, $NA_1$, $NA_2$, $NA_3$ and $NA_4$ denote the numerical apertures of the input straight waveguide (1-2), the input microstructured waveguide (2), the sub-wavelength waveguide (3), the output microstructured waveguide (4) and the small end of the output tapered waveguide (5), respectively, wherein $W_1$ and $W_3$ are the mode field diameters of the input and output microstructured waveguide, respectively.

Preferably, the numerical apertures, the mode field diameters and the waveguide diameters of the segments should meet the conditions of $$NA_0 \cdot d_z = k_1 \cdot NA_1 \cdot W_1,$$

$$NA_1 \cdot W_1 = k_2 \cdot NA_2 \cdot d_c,$$

$$NA_2 \cdot d_c = k_3 \cdot NA_3 \cdot W_3,$$

$$NA_4 \cdot d_{ts2} = k_4 \cdot NA_3 \cdot W_3,$$

wherein $k_1$, $k_2$, $k_3$, $k_4$ are coefficients, the range of $k_1$ is 1.5 to 4, the range of $k_2$ is 1 to 2, the range of $k_3$ is 1 to 2, and the range of $k_4$ is 10 to 20, wherein $d_z$ denotes the diameter of the input straight waveguide (1-2), do denotes the diameter of the sub-wavelength waveguide (3).

Preferably, the number of sub-wavelength waveguides at the transmission segment should meet the condition of n≥2, wherein the sub-wavelength waveguides (3) are arranged in parallel and at least one end of a sub-wavelength waveguide (3) is connected with the core of the input microstructured waveguide (2), and at least one end of a sub-wavelength waveguide (3) is connected with the core of the output microstructured waveguide (4).

Preferably, the transmission segment is composed of two sub-wavelength waveguides (3) arranged in parallel, and one end of a sub-wavelength waveguide (3) is connected with the core of the input microstructured waveguide (2), and one end of the other sub-wavelength waveguide (3) is connected with the core of the output microstructured waveguide (4).

Preferably, the transmission segment is composed of three sub-wavelength waveguides (3) arranged in parallel, and one end of the central sub-wavelength waveguide (3) is connected with the core of the input microstructured waveguide (2), and one end of the two sub-wavelength waveguides (3) on the sides are connected with one of the two cores of the output microstructured waveguide (4), respectively.

Preferably, the number of air hole rings N should meet the condition of N>1 for the input microstructured waveguide (2) and the number of air hole rings N should meet the condition of N>=1 for the output microstructured waveguide (4), wherein for the microstructure waveguide composed of at least two rings of air holes, the diameter of air holes in each ring should increase gradually along radial direction, and the diameters of all air holes should be ranged from $\lambda_0/20$-$3\lambda_0$.

Preferably, the air holes are arranged in regular triangular meshes or in a circle ring for both the input microstructured waveguide and the output microstructured waveguide, the centers of the circle rings are the corresponding core centers of the microstructured waveguides.

The beneficial effects of the present invention are as follows:

1) The input and output microstructured waveguides are respectively arranged at both ends of the transmission end, which overcomes the shortcoming that conventional sub-wavelength waveguides need mechanical support in the whole transmission direction, thus optimizing the mode field distribution, reducing the confinement loss, etc. At the same time, the outer cladding at the transmission segment realizes the isolation of the sub-wavelength waveguide from the external environment and avoids the disturbance of the environment. In the sensor application, the external medium can be introduced to realize the special sensing function by cutting a part of the outer cladding.

2) The input segment is composed of an input tapered waveguide, a input straight waveguide and an input microstructured waveguide, so as to realize the conversion of a large input mode field into a matched mode field of the sub-wavelength waveguide, so as to realize low loss transmission.

3) The output waveguide of the present invention is a tapered waveguide, and the output segment is composed of an output waveguide and an output microstructured waveguide, which can effectively couple the mode field transmitted by the sub-wavelength waveguide.

4) The structure of the present invention can easily form a multi waveguide transmission structure to realize mode coupling, conversion and other functions between the waveguides. Moreover, the present invention can form a cascade structure to construct more complex functional devices. As the input and output segments are both solid core waveguide structures, as long as the connection segments match, different sizes of sub-wavelength waveguides can realize low loss connection.

BRIEF DESCRIPTION OF THE DRAWINGS

FIGS. 7A-7D are the k-value diagrams of the terahertz waveguide shown in FIG. 1, wherein FIG. 7A is the scatter diagram of $k_1$ varying with the diameter $d_z$ of the input straight waveguide, FIG. 7B is the scatter diagram of $k_2$ varying with the diameter $d_{in-3}$ of the innermost ring air holes of the input microstructured waveguide, FIG. 7C is the scatter diagram of $k_3$ varying with the diameter $d_c$ of the sub-wavelength waveguide, and FIG. 7D is the scatter diagram of $k_4$ varying with the diameter $d_{out}$ of the air holes in the output microstructured waveguide.

FIGS. 8A-8C are the mode field diagrams of the terahertz waveguide shown in FIG. 1, wherein FIG. 8A is the fundamental mode diagram of the input straight waveguide, FIG. 8B is the fundamental mode diagram of the input microstructured waveguide, and FIG. 8C is the fundamental mode diagram of the waveguide at the transmission segment.

DETAILED DESCRIPTION OF THE EMBODIMENTS

Embodiments of the present invention are described in detail below, examples of which are shown in the accompanying drawings, in which the same or similar labels from beginning to end indicate the same or similar elements or elements with the same or similar functions. The embodiments described below by reference to the accompanying drawings are illustrative and are intended to be used for the interpretation of the present invention and cannot be understood as a limitation of the present invention.

In the description of the present invention, it is to be understood that the terms "center", "longitudinal", "transverse", "length", "width", "thickness", "up", "down", "axial", "radial", "vertical", "horizontal", "inner", "outer" and the like refer to the orientation or position relationship shown in the attached drawings are used for the description of the present invention and the simplified description, rather than indicating or implying that the device or element in question must have a specific orientation, be constructed and operated in a specific orientation, and therefore cannot be understood as a limitation of the present invention. In addition, the terms "first" and "second" are used only for the purpose of description and cannot be understood as indicating or implying relative importance or implicitly indicating the number of technical features indicated Thus, the features defined as "first" and "second" may explicitly or implicitly include one or more of the features. In the description of the present invention, "multiple" means two or more, unless otherwise specifically defined.

In this invention, unless otherwise specified and limited, the terms "installation", "interconnection", "connection", "fixation" and other terms shall be understood in a broad sense. For example, it can be fixed connection, detachable connection, or integrated connection; it can be mechanical connection or electrical connection; it can be direct connection or indirect connection through intermediate medium, it can be the internal connection of two components. For the technicians in the field, the specific meaning of the above terms in the present invention can be understood according to the specific situation.

An embodiment of the terahertz waveguide of the present invention is described in detail with reference to the attached drawings Referring to FIGS. 1 to 9, a terahertz waveguide according to an embodiment of the present invention includes an input segment, a transmission segment and an output segment.

Figure 1:
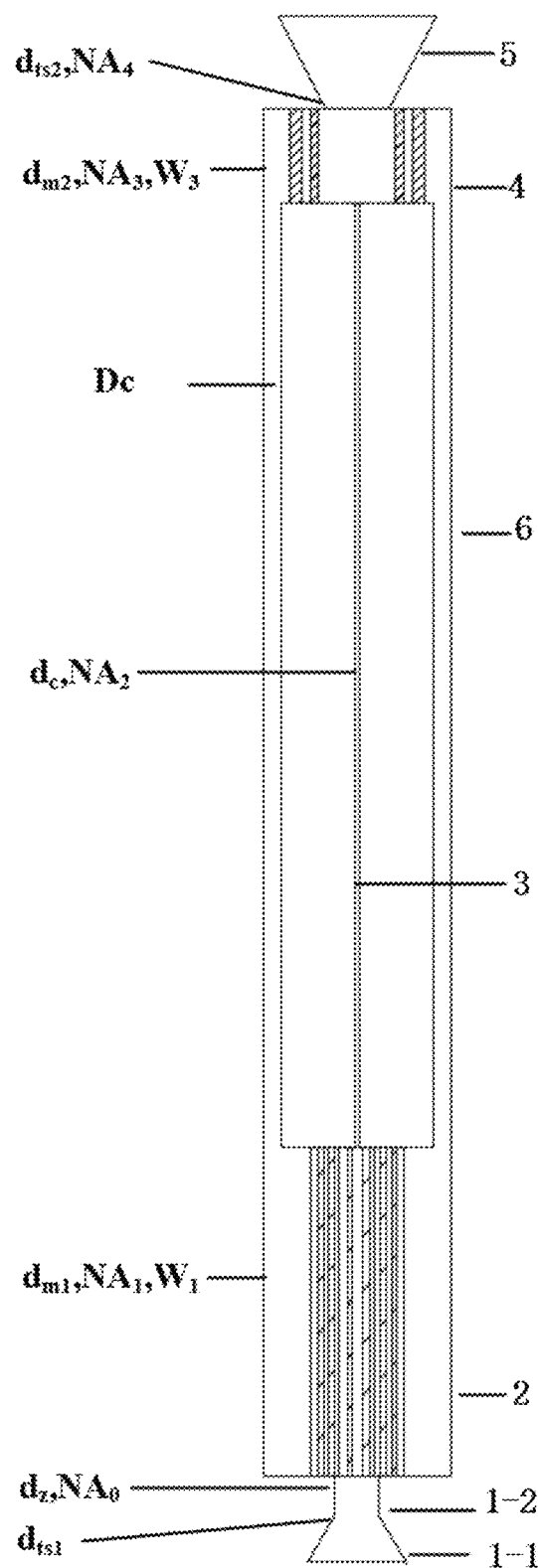
FIG. 1 is a structural diagram of an embodiment of a terahertz waveguide of the present invention.
Figure 2:
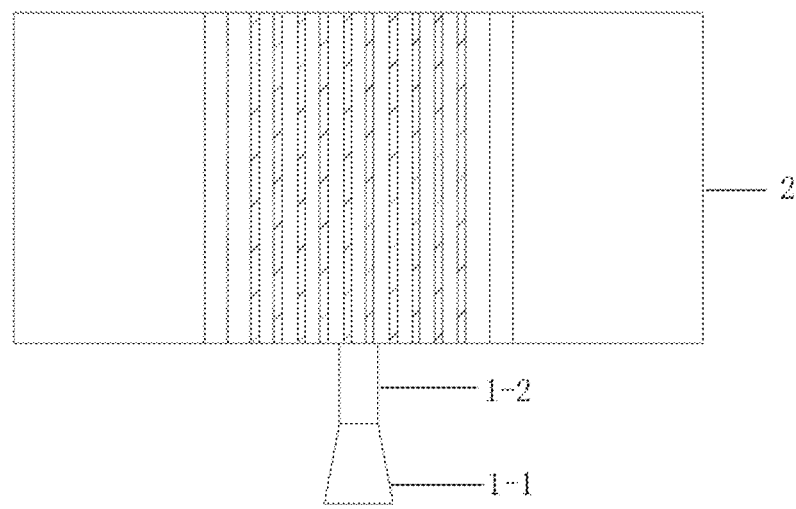
FIG. 2 is a schematic diagram of the input segment of the terahertz waveguide shown in FIG. 1.

Specifically, as shown in FIG. 1, the input includes an input waveguide 1 and an input microstructured waveguide 2, the transmission segment includes a sub-wavelength waveguide 3, an air cladding surrounding the sub-wavelength waveguide and an outer cladding 6 surrounding the air layer, and the output segment includes an output microstructured waveguide 4 and an output waveguide 5. One end of the input waveguide 1 is connected with one end of the core of the input microstructured waveguide 2, the other end of the core of the input microstructured waveguide 2 is connected with one end of the sub-wavelength waveguide 3, one end of the outer cladding 6 is connected with the cladding of the input microstructured waveguide 2, the other end of the outer cladding 6 is connected with the cladding of the output microstructured waveguide 4, and the other end of the sub-wavelength waveguide 3 is connected with one end of the core of the output microstructured waveguide 4. The other end of the core of the output microstructure waveguide 4 is connected with one end of the output end waveguide 5.

The diameter $d_c$ of the sub-wavelength waveguide 3 satisfies $d_c < \lambda_0$, where $\lambda_0$ is the working wavelength. Sub-wavelength waveguide 3 can reduce the transmission ratio of terahertz wave in the waveguide, thus reducing the material absorption loss. The claddings of the input microstructured waveguide 2 and the output microstructural waveguide 4 are composed of base materials and regularly arranged air holes, and the fiber cores of the input microstructured waveguide 2 and the output microstructured waveguide 4 are composed of base materials.

Figure 6:
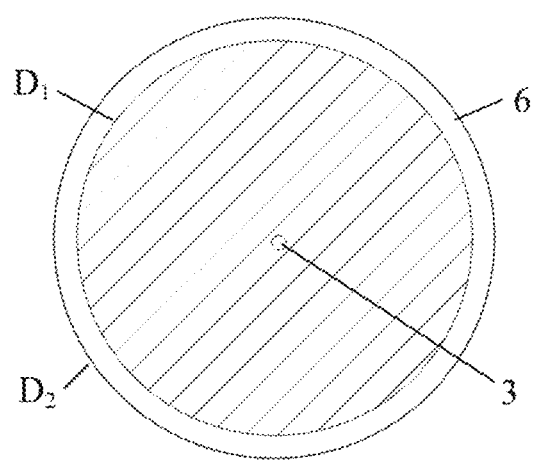
FIG. 6 is a cross-sectional view of the transmission segment of the terahertz waveguide shown in FIG. 1.
Figure 7A:
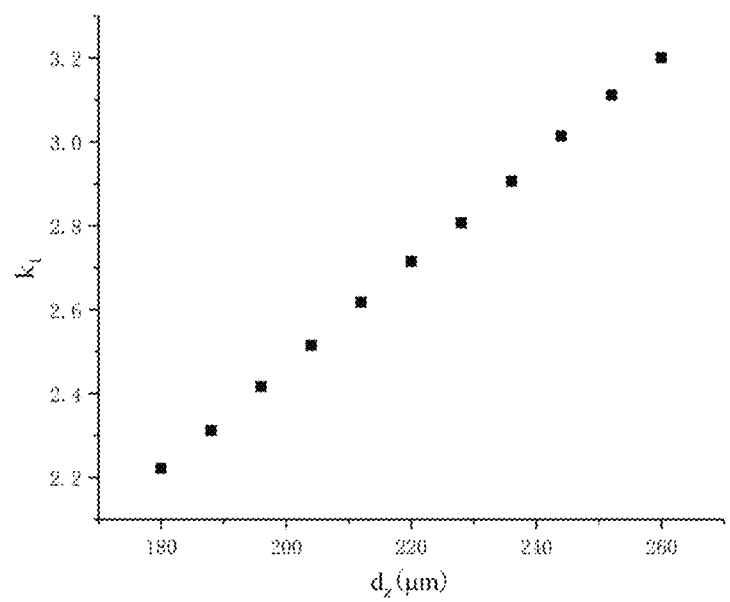
Figure 7B:
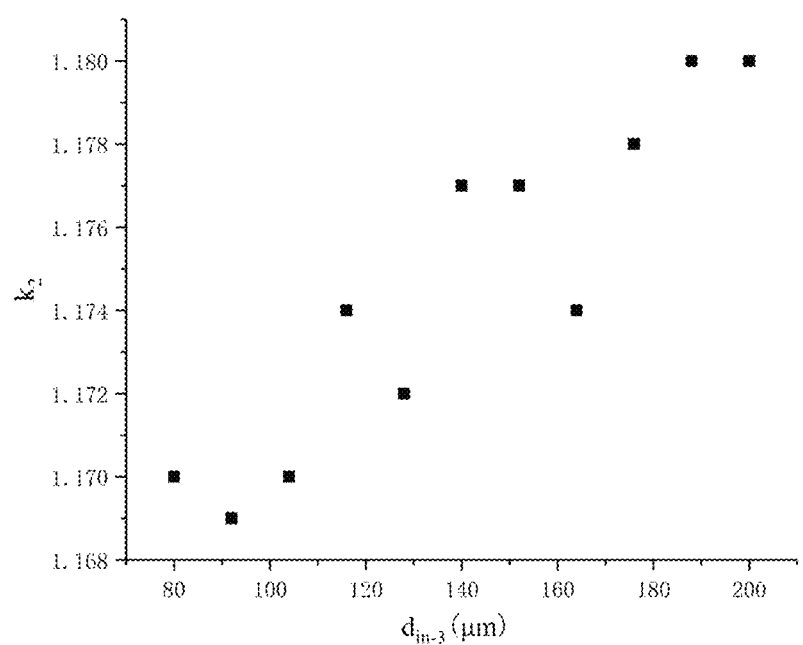
Figure 7C:
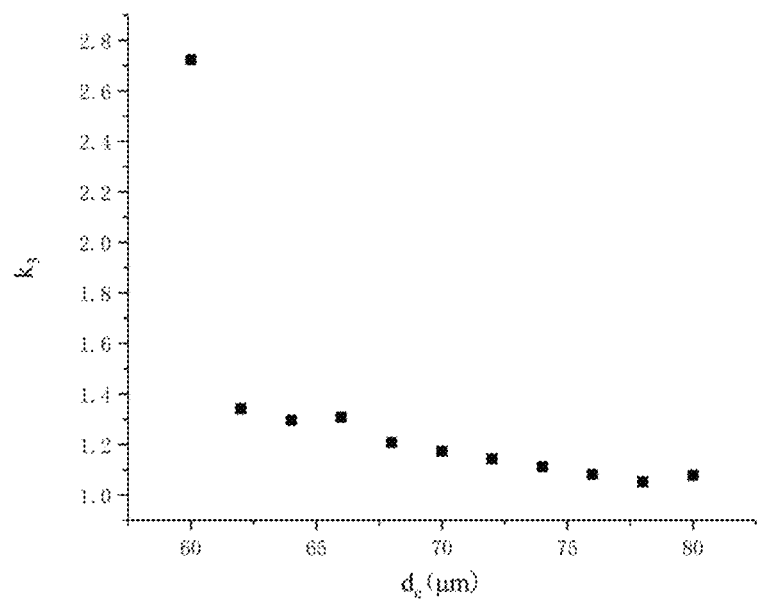
Figure 7D:
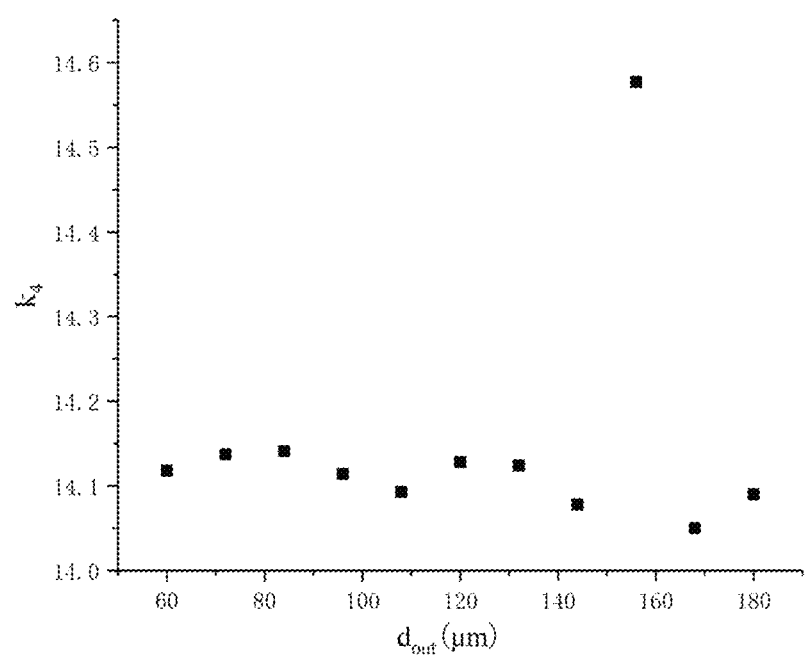

Therefore, the terahertz waveguide according to the embodiment of the present invention, by connecting the input and output microstructured waveguides at the two ends of the transmission segment, the sub-wavelength waveguide 3 and the outer cladding 6 are supported mechanically, which overcomes the disadvantage that the conventional sub-wavelength waveguide needs mechanical support in the whole transmission direction. Simultaneously, as shown in FIG. 6, the outer cladding of the transmission segment can isolate the sub-wavelength waveguide 3 from the external environment, so that the terahertz wave can be transmitted in the sub-wavelength waveguide 3 and the air cladding, thus avoiding the disturbance of the environment. The terahertz waveguide of the embodiment of the present invention does not need support elements in the longitudinal direction except that microstructured waveguides are introduced to support the sub-wavelength waveguide at both ends, so as to effectively reduce the transmission loss of the waveguide because confinement loss induced by the support elements is eliminated. In addition, the input microstructured waveguide 2 and the output microstructural waveguide 4 can also effectively convert the mode field of terahertz waveguide mode, so that the terahertz wave in the input segment can effectively couple into the sub-wavelength waveguide 3, and the terahertz wave output from the sub-wavelength waveguide 3 can be effectively coupled to the output segment.

If it is necessary to connect two terahertz waveguides according to the embodiment of the present invention, for example, to connect the output segment of the first terahertz waveguide with the input segment of the second terahertz waveguide, it is only necessary to design the structure of the two terahertz waveguides so that the output end face size of the output waveguide of the first terahertz waveguide is the same as the input end face size of the input waveguide of the second terahertz waveguide, then low loss connection between them can be realized. Therefore, the terahertz waveguide according to the embodiment of the present invention can easily form cascade structure, thus forming more complex waveguide devices and realizing more complex functions.

Preferably, in this embodiment, the input segment includes an input tapered waveguide 1-1 and an input straight waveguide 1-2, the narrow end of the input tapered waveguide 1-1 is connected with one end of the input straight waveguide 1-2, and the other end of the input straight waveguide 1-2 is connected with one end of the core of the input microstructured waveguide 2. The output waveguide 5 is a tapered waveguide, and the narrow end of the output waveguide 5 is connected with the other end of the core of the output microstructured waveguide 4.

The input segment is composed of tapered waveguide 1-1, input straight waveguide 1-2 and input microstructured waveguide 2, which can convert large input mode field into matched mode field of the sub-wavelength waveguide, so as to realize low loss transmission. Considering the matching between the spot diameter and the waveguide aperture, the spot size of different terahertz wave sources is different. The wide end of the tapered waveguide 1-1 at the input end can be flexibly adjusted to meet different wave sources. On the other hand, the straight waveguide 1-2 can play a transitional role in adjusting the waveform so that the wave can be better coupled into the input microstructured waveguide 4.

The output segment is composed of an output tapered waveguide 5 and an output microstructured waveguide 4, which can effectively couple the mode field transmitted by sub-wavelength waveguide, and expand the mode field diameter of the waveform to a certain extent to adapt to the input port size of a terahertz detector. The input tapered waveguide 1-1, the input straight waveguide 1-2 and the output waveguide 5 all have large cross-sectional dimensions, which can effectively reduce the energy ratio of the terahertz wave in the air, and can effectively connect with terahertz sources.

Preferably, in this embodiment, the cross-sections of the input tapered waveguide 1-1, the input straight waveguide 1-2, the input microstructured waveguide 2, the output microstructural waveguide 4 and the output waveguide 5 are circular, in addition, the input tapered waveguide 1-1, the input straight waveguide 1-2 and the input microstructured waveguide 2 are coaxial, whereas the output microstructured waveguide 4 and the output waveguide 5 are coaxial.

The diameters of the waveguides should meet the condition of $d_{m2} > d_{ts2} > d_{m1} > d_{ts1} = d_z > d_c$, where $d_{ts2}$ is the narrow end diameter of the output waveguide 5, $d_{m2}$ is the core diameter of the output microstructured waveguide 4, $d_{ts1}$ is the narrow end diameter of the input tapered waveguide 1-1, $d_z$ is the diameter of the input straight waveguide 1-2, and $d_{m1}$ is the core diameter of the input microstructured waveguide 2. The core radius of the microstructured waveguide 2 or 4 is defined as the distance between the center of the core and the center of the innermost air hole minus the radius of the innermost air hole, wherein the core diameter of the microstructured waveguide equals twice of the core radius of the microstructured waveguide.

The parameters are set based on the actual conditions of waveguide fabrication and the stability of waveguide mechanical structure and preventing the air holes from being covered or damaged.

Preferably, the length of the input tapered waveguide is set as $\frac{1}{2}\lambda_0 - 5\lambda_0$, the length of the input straight waveguide is set as $\frac{1}{2}\lambda_0 - 5\lambda_0$, the length of the input microstructured waveguide is set as $\frac{1}{2}\lambda_0 - 5\lambda_0$, and the length of the transmission segment is set as 5-100 cm, which can be set based on the required length and absorption loss. The length of output microstructured waveguide is set as $\lambda_0 - 30\lambda_0$, and the length of output tapered waveguide is set as $\lambda_0 - 30\lambda_0$.

Because the input microstructured waveguide 2 and the output microstructured waveguide 4 are composed of base material and air holes arranged on the base material, and their numerical aperture is smaller than that of the sub-wavelength waveguide 3. Therefore, the core diameter of output microstructured waveguide 4 should be larger than that of the input microstructured waveguide 2, so that the terahertz wave output from the sub-wavelength waveguide 3 can be effectively coupled into the output microstructured waveguide 4.

Based on the formula of fundamental mode diameter $$d = \frac{2\sqrt{2}}{\pi} \frac{\lambda_0}{NA},$$

where NA is the maximum theoretical numerical aperture of single-mode waveguide, and the relationship between the power of fundamental mode core and the diameter of fiber core obtained from experiments, it is found that the numerical apertures of the waveguides should meet the conditions of $NA_4 \cdot d_{ts2} > NA_0 \cdot d_z > NA_1 \cdot W_1 > NA_2 \cdot d_c > NA_3 \cdot W_3$, where $NA_0$ is the numerical aperture of the input straight waveguide 1-2, $NA_1$ is the numerical aperture of the input microstructured waveguide 2, $NA_2$ is the numerical aperture of the sub-wavelength waveguide 3, $NA_3$ is the numerical aperture of the output microstructured waveguide 4, $NA_4$ is the numerical aperture of the narrow end of the output waveguide 5, $W_1$ is the mode field diameter of the input microstructured waveguide 2, and the mode field diameter of the output microstructured waveguide 5 is $W_3$ The numerical relationship is obtained by simulation. The mode field diameter decreases gradually from the large diameter end of the input tapered waveguide 1-1, so that most of the terahertz waves can be effectively coupled into the sub-wavelength waveguide 3, when the terahertz waves reach the output waveguide 5, the mode field will expand, and the mode field diameter increases, so that the wave can be effectively coupled into the corresponding receiving equipment.

Furthermore, the numerical apertures should satisfy the following relations: $NA_0 \cdot d_z = k_1 \cdot NA_1 \cdot W_1$, $NA_1 \cdot W_1 = k_2 \cdot NA_2 \cdot d_c$, $NA_2 \cdot d_c = k_3 \cdot NA_3 \cdot W_3$, $NA_4 \cdot d_{ts2} = k_4 \cdot NA_3 \cdot W_3$.

Among them, $d_z$ is the diameter of the input straight waveguide 1-2, $d_c$ is the diameter of sub wavelength waveguide 3, and $k_1$, $k_2$, $k_3$, $k_4$ are proportional coefficients. As can be seen from FIGS. 7A-7D, the value range of $k_1$ is 1.5-4, the value range of $k_2$ is 1-2, the value range of $k_3$ is 1-2, and the value range of $k_4$ is 10-20. When the above relationship is met, terahertz wave can be transmitted efficiently.

Figure 8A:
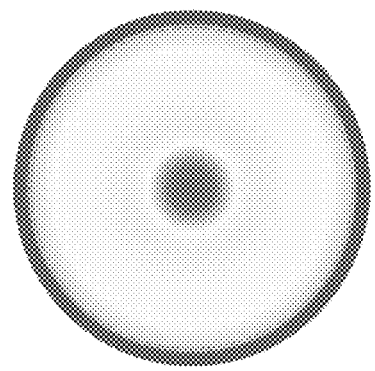
Figure 8B:
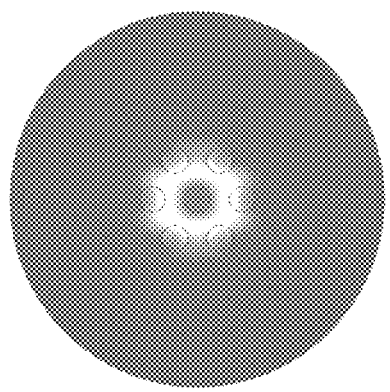
Figure 8C:
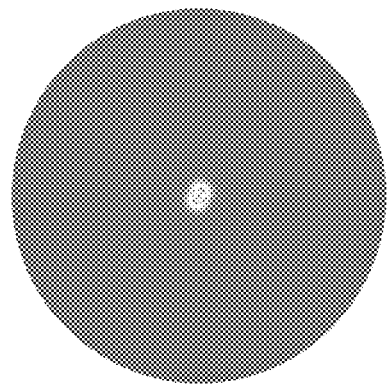

It can be seen from FIGS. 8A-8C that there are large differences in the mode field distribution and mode field size between the input straight waveguide 1-2 and the sub-wavelength waveguide 3. The cladding of the input straight waveguide 1-2 is air, while the core of the input microstructured waveguide 2 is surrounded by air holes. Therefore, the refractive index distribution of the two waveguides is similar, which can effectively reduce the connection loss between the two waveguides. Although the core diameter of the input microstructured waveguide 4 is larger than that of the sub-wavelength waveguide 3, its numerical aperture is smaller than that of the sub-wavelength waveguide 3, therefore, low loss connection can still be realized.

Preferably, in the present embodiment, the ring number of air holes in the input microstructured waveguide 2 is greater than 1, and the ring number of air holes in the output microstructured waveguide 4 is not less than 1, which is usually set as 1-8. For the condition of the ring number of air holes is not less than 2 either in the input microstructured waveguide 2 or in the output microstructured waveguide 4, the diameter of air holes in each ring should gradually increase along radial direction, that is, the inner air holes have smaller diameter than the outer air holes. The reason is that the lower the equivalent cladding refractive index is, the lower the absorption loss is, and the higher the efficiency of terahertz wave transmission. The diameter range of air hole should be in the range of $\lambda_0/20 - 3\lambda_0$, which can ensure the mechanical stability of the waveguide structure.

Figure 3:
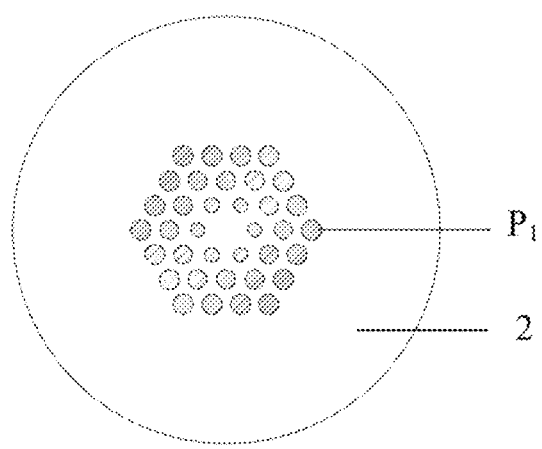
FIG. 3 is a schematic diagram of the cross-section of the input microstructured waveguide shown in FIG. 1.
Figure 4:
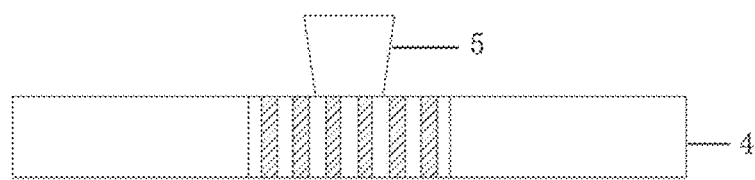
FIG. 4 is a schematic diagram of the output segment of the terahertz waveguide shown in FIG. 1.
Figure 5:
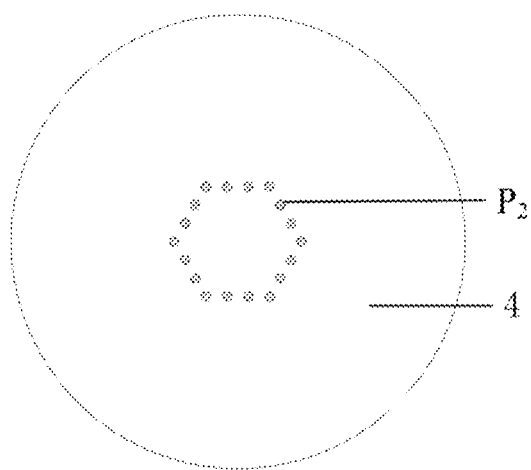
FIG. 5 is a cross-section diagram of the output microstructured waveguide shown in FIG. 4.

Furthermore, the arrangement of air holes in the input microstructured waveguide 2 and the output microstructured waveguide 4 can be selected according to the waveguide function to realize the waveguide beam splitter, coupler, etc. In general, the core is a solid polymer material, and there can be multiple air holes outside the core. Furthermore, as shown in FIG. 3, the air holes in the input microstructured waveguide 2 are arranged in the regular triangular grid. It should be noted that the air holes in the input microstructured waveguide 2 in the present embodiment are not limited to the regular triangular grid, but can also be arranged on the circumference with the core center as the center of the circumference. The arrangement requirement of air holes in the output microstructured waveguide 4 is also the same.

Preferably, in the present embodiment, the transmission segment includes at least two sub-wavelength waveguides 3 arranged in parallel, wherein one end of at least one sub-wavelength waveguide 3 is connected with the core of the input microstructured waveguide 2, and one end of at least one sub-wavelength waveguide 3 is connected with the core of the output microstructure waveguide 4.

Figure 9:
FIG. 9 is a cross-sectional view of a terahertz waveguide with two sub-wavelength waveguides of a terahertz waveguide according to an embodiment of the present invention.

Further, as shown in FIG. 9, the transmission segment includes two sub-wavelength waveguides 3 arranged in parallel, one end of one sub-wavelength waveguide 3 is connected with the core of the input microstructured waveguide 2, and one end of the other sub-wavelength waveguide 3 is connected with the core of the output microstructured waveguide 4. This structure can couple the input terahertz wave to another port and output it. By using the characteristics of coupling length dependence on wavelength, this structure can realize filtering and other functions.

Figure 10:
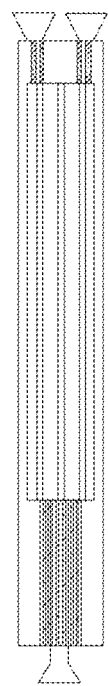
FIG. 10 is a sectional view of a terahertz waveguide with three sub-wavelength waveguides according to an embodiment of the present invention.

Further, as shown in FIG. 10, the transmission segment includes three sub-wavelength waveguides 3 arranged in parallel, one end of the sub-wavelength waveguide 3 at the middle position is connected with the core of the input microstructured waveguide 2, and one end of the other two sub-wavelength waveguides 3 is respectively connected with the two cores of the output microstructured waveguide 4. This structure can divide the input terahertz wave into two sub-wavelength waveguides and couple them out effectively, so as to realize the function of uniform beam splitting.

Preferably, in the present embodiment, an example of the waveguide structure is shown in FIG. 1. The diameter of the large end of the input tapered waveguide 1-1 is 710 μm, the diameter of the narrow end is 250 μm and the length is 1000 μm. The diameter and length of the input straight waveguide 1-2 are 250 μm and 1000 μm respectively. For this embodiment, the value of $k_1$ is 3.11. The incident wavelength is 270 p m, the material is polyethylene, which has low terahertz absorption loss, and the refractive index is 1.53.

There are three layers of air holes arranged outside the core of the input microstructured waveguide 2. The air holes are arranged in a regular triangular grid. The period $P_1$ of the air holes is 200 μm. The diameter of the first air hole ring is 112 μm, the diameter of the air holes in the second ring is 126 μm and the diameter of the air holes in the third ring is 176 μm. The length of the input microstructured waveguide 2 is 1400 μm, the total diameter is 1680 μm, and the value of $K_2$ is 1.18.

The sub-wavelength waveguide 3 is a solid core polyethylene waveguide with a diameter of 70 μm, and the length of the main waveguide can be flexibly selected. In this embodiment, the length is set as 5 cm. The outer diameter $D_2$ is 1490 μm, the inner diameter $D_1$ is 1300 μm, the cladding thickness $D_c$ is 190 μm, and $k_3$ is 1.17.

The output microstructured waveguide 4 has a ring of air holes arranged in a regular triangular grid. The period $P_2$ of the air hole is 240 μm. The distance between the center of the air holes and the center of the cross-section of the waveguide 3 in the same horizontal plane is 720 μm. The diameter of the air holes is 120 μm.

The narrow end of the output waveguide 5 is connected with the output microstructured waveguide 4 based on the central axes of the two waveguides. The diameter of the narrow end is 1140 pm. The terahertz wave is emitted from the wide end of the output waveguide 5. The diameter of the wide end is 1440 μm. It can be effectively connected with equipment such as terahertz time domain spectroscopy. The value of $k_4$ is 14.12.

According to the calculation, the embodiment should meet the condition of $$NA_4 \cdot d_{ts2} > NA_0 \cdot d_z > NA_1 \cdot W_1 > NA_2 \cdot d_c > NA_3 \cdot W_3.$$

Figure 11:
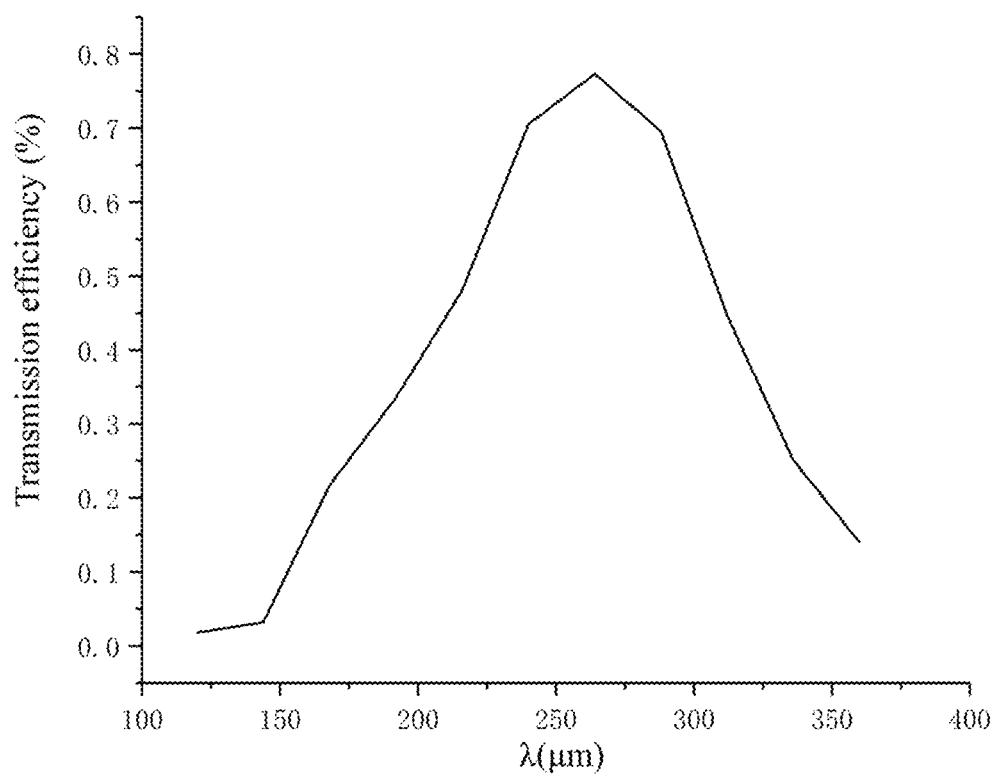
FIG. 11 shows the transmission efficiency spectrum of a terahertz waveguide according to an embodiment of the present invention.

The transmission theory of the above waveguide components, whether it is the input microstructured waveguide 2, the output microstructured waveguide 4 or the sub-wavelength waveguide 3, is based on total reflection theory. Considering the structural loss, as shown in FIG. 11, the final fundamental mode output efficiency can reach about 80%.

In the description of this specification, a description of the reference terms "one embodiment," "some embodiments," "examples," "specific examples," or "some examples" and the like means that specific features, structures, materials, or features described in connection with the embodiments or examples are included in at least one embodiment or example of the present invention. In this specification, a schematic description of the above terms does not necessarily refer to the same embodiment or example. Moreover, the specific features, structures, materials or features described may be combined in an appropriate manner in any one or more embodiments or examples.

Although the embodiments of the present invention have been shown and described above, it can be understood that the above embodiments are illustrative and cannot be understood as a limitation of the present invention. A technician in the art can change, modify, replace and modify the above-mentioned embodiments within the scope of the present invention without departing from the principle and purpose of the present invention.

What is claimed is:

1. A terahertz waveguide, comprising:
an input segment, wherein the input segment comprises an input waveguide and an input microstructured waveguide, and one end of the input waveguide is connected with a first end of a core of the input microstructured waveguide;
a transmission segment, wherein the transmission segment comprises a sub-wavelength waveguide, an air cladding surrounding the sub-wavelength waveguide and a solid outer cladding surrounding the air cladding, a second end of the core of the input microstructured waveguide is connected with a first end of the sub-wavelength waveguide, and a first end of the solid outer cladding is connected with a cladding of the input microstructured waveguide; and
an output segment, wherein the output segment comprises an output microstructured waveguide and an output waveguide, a second end of the sub-wavelength waveguide is connected with a first end of a core of the output microstructured waveguide, a second end of the solid outer cladding is connected with a cladding of the output microstructured waveguide, a second end of the core of the output microstructured waveguide is connected with one end of the output waveguide;
wherein a diameter $d_c$ of the sub-wavelength waveguide satisfies $d_c < \lambda_0$, wherein $\lambda_0$ is an operating wavelength, and the claddings of the input microstructured waveguide and the output microstructured waveguide both consist of a base material and regularly arranged air holes, and the cores of the input microstructured waveguide and the output microstructured waveguide both consist of the base material.

2. The terahertz waveguide according to claim 1, wherein the input segment comprises an input tapered waveguide and an input straight waveguide, a small end of the input tapered waveguide is connected with a first end of the input straight waveguide, and a second end of the input straight waveguide is connected with the first end of the core of the input microstructured waveguide; and the output waveguide is a tapered waveguide, and a small end of the output waveguide is connected with the other second end of the core of the output microstructured waveguide.

3. The terahertz waveguide according to claim 2, wherein cross-sections of the input tapered waveguide, the input straight waveguide, the input microstructured waveguide, the output microstructured waveguide, and the output waveguide are of circular symmetry, the input tapered waveguide, the input straight waveguide and the input microstructured waveguides are coaxial, the output microstructured waveguide and the output waveguide are coaxial;

the small end of the output waveguide has a diameter $d_{ts2}$, the core of the output microstructured waveguide has a diameter $d_{m2}$, the small end of the input tapered waveguide has a diameter $d_{ts1}$, the input straight waveguide has a diameter $d_z$, and the core of the input microstructured waveguide has a diameter $d_{m1}$, wherein $d_{m2}>d_{ts2}>d_{m1}>d_{ts1}=d_z>d_c$.

4. The terahertz waveguide according to claim 3, wherein the input straight waveguide has a numerical aperture $NA_0$, the input microstructured waveguide has a numerical aperture $NA_1$, the sub-wavelength waveguide has a numerical aperture $NA_2$, the output microstructured waveguide has a numerical aperture $NA_3$, the small end of the output waveguide has a numerical aperture $NA_4$, the input microstructured waveguide has a mode field diameter $W_1$, and the output microstructured waveguide has a mode field diameter $W_3$, wherein $NA_4 \cdot d_{ts2} > NA_0 \cdot d_z > NA_1 \cdot W_1 > NA_2 \cdot d_c > NA_3 \cdot W_3$.

5. The terahertz waveguide according to claim 4, wherein the following relationships are satisfied:

$$NA_0 \cdot d_z = k_1 \cdot NA_1 \cdot W_1,$$

$$NA_1 \cdot W_1 = k_2 \cdot NA_2 \cdot d_c,$$

$$NA_2 \cdot d_c = k_3 \cdot NA_3 \cdot W_3,$$

$$NA_4 \cdot d_{ts2} = k_4 \cdot NA_3 \cdot W_3,$$

wherein $k_1$, $k_2$, $k_3$, and $k_4$ are coefficients, $k_1$ ranges from 1.5 to 4, $k_2$ ranges from 1 to 2, $k_3$ ranges from 1 to 2, and $k_4$ ranges from 10 to 20, $d_z$ denotes the diameter of the input straight waveguide, and $d_c$ denotes the diameter of the sub-wavelength waveguide.

6. The terahertz waveguide according to claim 1, wherein the transmission segment comprises at least two sub-wavelength waveguides arranged in parallel, one end of at least one of the at least two sub-wavelength waveguides is connected with the core of the input microstructured waveguide, and one end of at least one of the at least two sub-wavelength waveguides is connected with the core of the output microstructured waveguide.

7. The terahertz waveguide according to claim 6, wherein the transmission segment comprises two sub-wavelength waveguides arranged in parallel, one end of one of the two sub-wavelength waveguides is connected with the core of the input microstructured waveguide, and one end of the other one of the two sub-wavelength waveguides is connected with the core of the output microstructured waveguide.

8. The terahertz waveguide according to claim 6, wherein the transmission segment comprises three sub-wavelength waveguides arranged in parallel, one end of one of the three sub-wavelength waveguides located in a middle position is connected with the core of the input microstructured waveguide, and one end of each of the other two of the three sub-wavelength waveguides is connected with a respective one of two cores of the output microstructured waveguide.

9. The terahertz waveguide according to claim 1, wherein the input microstructured waveguide comprises more than 1 layer of the regularly arranged air holes, and the output microstructured waveguide comprises no less than 1 layer of the regularly arranged air holes;

when the input microstructured waveguide or the output microstructured waveguide comprises no less than 2 layers of the regularly arranged air holes, a diameter of the regularly arranged air holes in each of the no less than 2 layers increases gradually in a radially outward direction from a corresponding core, and the diameter of the regularly arranged air holes ranges from $\lambda_0/20$ to $3\lambda_0$.

10. The terahertz waveguide according to claim 1, wherein the regularly arranged air holes in the input microstructured waveguide or the output microstructured waveguide are arranged in regular triangle-shaped grids or on circumferences of circles with a core center of a corresponding microstructured waveguide as a center of the circles.

11. The terahertz waveguide according to claim 9, wherein the regularly arranged air holes in the input microstructured waveguide or the output microstructured waveguide are arranged in regular triangle-shaped grids or on circumferences of circles with a core center of a corresponding microstructured waveguide as a center of the circles.

* * * * *